United States Patent [19]

Kadono

[11] 4,386,919
[45] Jun. 7, 1983

[54] FLOAT FOR LOADING HOSES

[75] Inventor: Mamoru Kadono, Yokohama, Japan

[73] Assignee: Bridgestone Tire Company Limited, Tokyo, Japan

[21] Appl. No.: 251,841

[22] Filed: Apr. 8, 1981

[30] Foreign Application Priority Data

Apr. 14, 1980 [JP] Japan .............................. 55-50242[U]

[51] Int. Cl.³ ................................................ B63B 21/52
[52] U.S. Cl. .................................. 441/133; 285/419; 403/46; 403/344
[58] Field of Search ............... 441/133, 134; 114/267; 411/400; 24/241 R; 403/43, 46, 344; 285/373, 419, 367; 292/256, 115, 96

[56] References Cited

U.S. PATENT DOCUMENTS

| | | | |
|---|---|---|---|
| 2,895,197 | 7/1959 | Agne et al. ......................... | 285/367 |
| 3,307,866 | 3/1967 | Barlow ............................... | 292/115 |
| 3,423,111 | 1/1969 | Elsner ................................ | 285/373 |
| 4,079,970 | 3/1978 | Brett .................................. | 285/367 |

FOREIGN PATENT DOCUMENTS 118769  9/1918  United Kingdom ................. 403/44

Primary Examiner—Trygve M. Blix
Assistant Examiner—Thomas J. Brahan
Attorney, Agent, or Firm—Sughrue, Mion, Zinn, Macpeak and Seas

[57] ABSTRACT

A float for loading hoses composed of a pair of semi-annular hard floating bodies hinged at one end portion thereof and provided at the other end portions with opposed rectangular notches, a female screw threaded member and hook-shaped member snugly fitted in said notches, respectively, and engaged with pins, respectively, extending through the members, and a bolt having oppositely inclined screw threads at its front and rear end portions and threadedly engaged with said female screw threaded member and hook-shaped member, respectively, whereby when the bolt is fastened so as to fit the float around the loading hose the front and rear end portions of the bolt make contact with the pins extending through the female screw threaded member and hook-shaped member, respectively.

4 Claims, 8 Drawing Figures

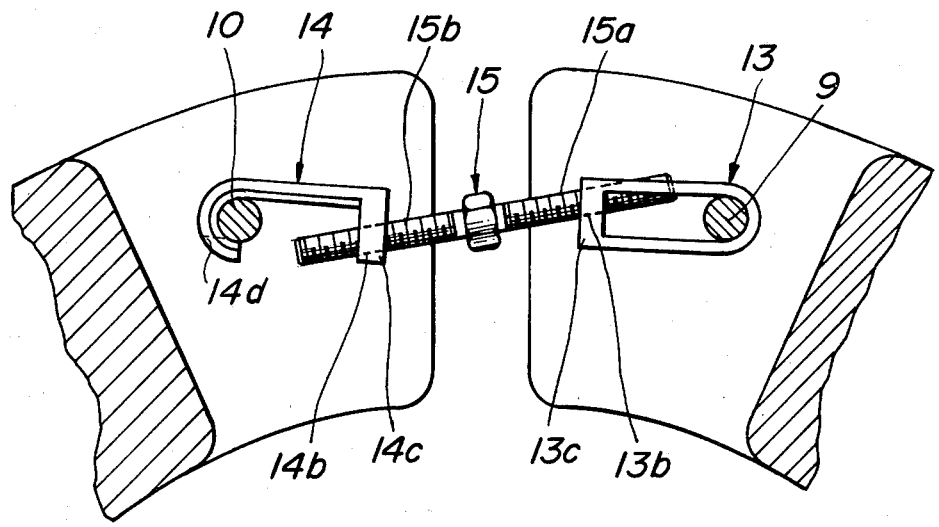
FIG._5A
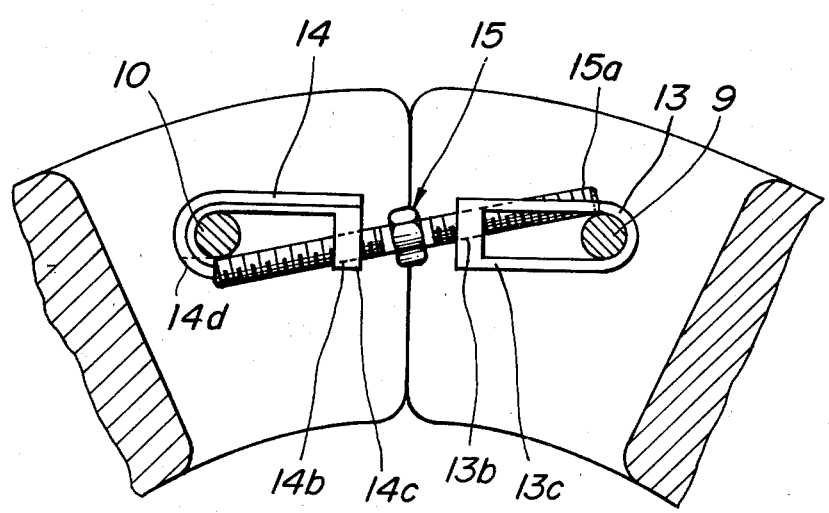
FIG._5B

FLOAT FOR LOADING HOSES

BACKGROUND OF THE INVENTION

1. Field of the Invention

This invention relates to a float for loading hoses operative to connect a pipe line laid on a seabed to a marine hose connected to a ship.

2. Description of the Prior Art

A marine float is usually fitted around a hose of the loading hose line for connecting a buoy that floats on water and in turn is connected to the marine hose to the pipe line laid on the seabed. It functions to cause the loading hose line to form suitable catenary line for the purpose of causing the loading hose line to be flexibly moved in response to sea-wave action without buckling.

This type of float is composed of two semi-annular hard floating bodies each provided therein with a floating material. These two semi-annular floating bodies are provided at one end portion thereof with a depression and projection which are hinged through a pin and at the other end portion thereof with rectangular notches opposed with each other and extended through by pins, respectively. Around one of these pins is fitted a bearing member which is connected through a turnbuckle to a hook fastened to the other pin. The turnbuckle functions to provide a force to the pins to cause them to approach each other.

Such a conventional float for loading hoses has the drawback that many years of use result not only in bending of the pins but also in opening of the hook, thereby disengaging the float from the loading hose.

Many attempts have been made to eliminate such drawbacks, but none has led to satisfactory results.

SUMMARY OF THE INVENTION

An object of the invention, therefore, is to provide a float for loading hoses which can eliminate the above mentioned drawbacks which have been encountered with the prior art techniques.

A feature of the invention is the provision of a float for loading hoses comprising a pair of semi-annular hard floating bodies, a pin extending through one end portion of each of said semi-annular floating bodies and constituting a hinge on which said semi-annular floating bodies swing. A pair of opposed notches are formed at the other end portions of said semi-annular floating bodies, and a female screw threaded member secured to one of said notches by means of a pin extends through one of the notches and has a width which is substantially equal to the width of one of the notches. A hook shaped member is adapted to be engaged with a pin extending through the other notch and has a width which is substantially equal to the width of the other notch. A bolt is provided at each end portion thereof with oppositely inclined screw threads and is threadedly engaged with the female screw threaded member and said hook shaped member, respectively. When the bolt is fastened to fit the float around the loading hose, the end portion of the bolt is projected into said hook-shaped member to prevent the pin from being disengaged from the hook-shaped member.

Further objects and features of the invention will be fully understood from the following detailed description with reference to the accompanying drawings, wherein:

BRIEF DESCRIPTION OF THE DRAWINGS

FIGS. 5A and 5B are enlarged cross-sectional views of a third embodiment of a float for loading hoses according to the invention in which the front end portion of the bolt makes contact with the upper surface of the pin extending through the female screw threaded member while the rear end portion of the bolt makes contact with the lower surface of the pin extending through the hook-shaped member when the bolt is fastened to fit the float around the loading hose.

DETAILED DESCRIPTION OF THE PREFERRED EMBODIMENTS

Figure 1:
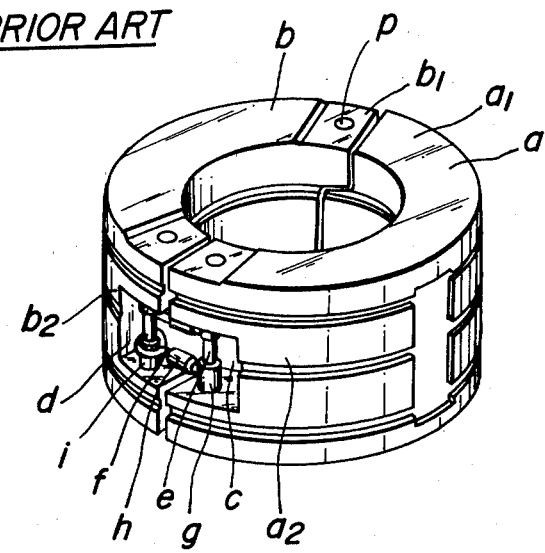
FIG. 1 is a perspective view of a conventional float for loading hoses.

FIG. 1 shows a conventional float for loading hoses which is composed of a pair of semi-annular hard floating bodies a, b each including therein a floating material. The floating bodies, a, b are provided at one of end portions $a_1$, $b_1$ thereof with a depression and projection mutually engaged and hinged with each other by means of a pin p extending through these depressions and projections. The floating bodies a, b are provided at the other end portions $a_2$, $b_2$ thereof with rectangular notches c, d opposed to each other and having extended therethrough by pins e, f, respectively. Around one of the pins, for example, the pin e is fitted a bearing member g which is connected through a turnbuckle h to a hook i. The hook i engages with the other pin f. The turnbuckle h functions to provide a force to the pins e, f to allow these pins to come near with each other. As a result, many years of use have resulted not only in bending of the pins e, f but also in opening of the hook i. Thus, there is a risk of the float being disengaged from the loading hose.

The invention provides a float for loading hoses which can eliminate the above mentioned drawback.

Figure 2:
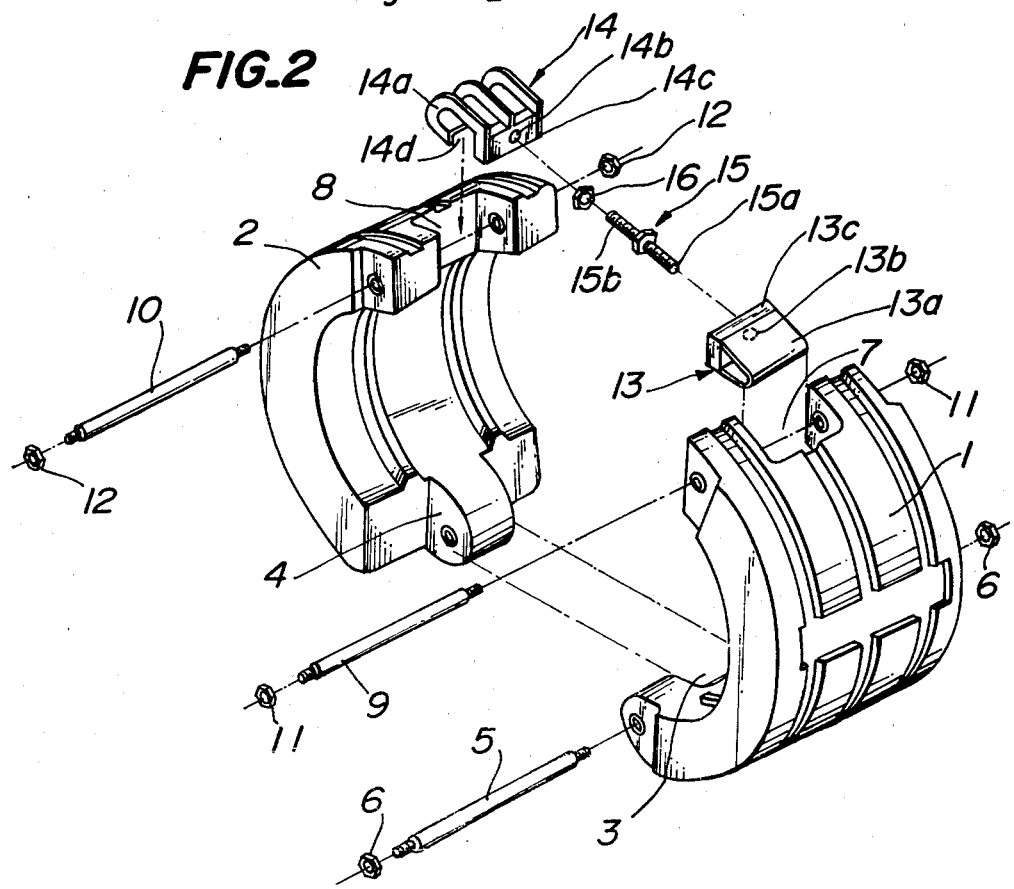
FIG. 2 is a fragmentary perspective view of one embodiment of a float for loading hoses according to the invention.

FIG. 2 shows one embodiment of a float for loading hoses. In FIG. 2, reference numerals 1, 2 designate semi-annular hard floating bodies.

The semi-annular floating bodies 1, 2 are provided at one of ends thereof with a depression 3 and projection 4. These depression 3 and projection 4 engage with each other and have a common hole with a pin 5 extending through. The pin 5 is threadedly engaged at its ends with nuts 6, 6, respectively, such that the semi-annular floating bodies 1, 2 are joined with a hinge at one of ends thereof.

The semi-annular floating bodies 1, 2 are provided at the other ends thereof with rectangular notches 7, 8 opposed to each other. These notches 7, 8 have pins 9, 10 extending through, respectively, which are threadedly engaged at respective ends thereof with nuts 11, 12, respectively.

With one of the pins 9, 10, for example, pin 9 engages a female screw threaded member 13 having a width which is substantially equal to the width of the notch 7. It is composed of a U-shaped member 13a open at the ends thereof facing the notch 7 and a face plate 13c secured to that end of the U-shaped member 13a which is opposed to the notch 8 and provided at its center portion with a tapped hole 13b. The pin 10 is engaged with a hook-shaped member 14 having a width which is substantially equal to the width of the notch 8. The hook-shaped member 14 is composed of a hook portion 14a is and a face plate 14c located at that portion of the hook portion 14a opposing the notch 7 and provided at its outer portion with a tapped hole 14b.

The tapped holes 13b, 14b are provided with oppositely inclined screw threads. In FIG. 2, reference numeral 15 designates a bolt provided at its end portions with oppositely inclined screw threads 15a, 15b.

Figure 3A:
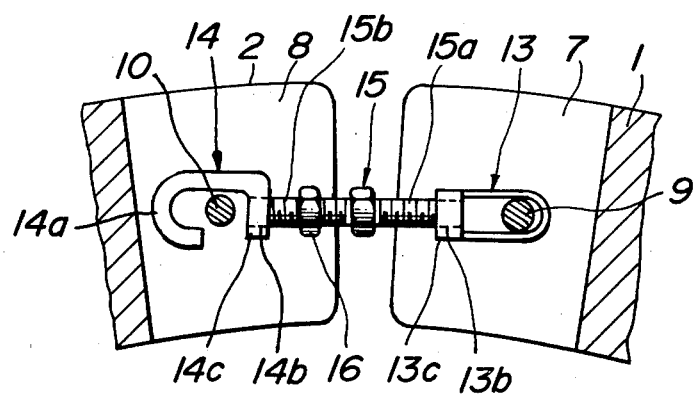
FIG. 3A is an enlarged cross-sectional view of a bolt showing in FIG. 2 and having end portions threadedly engaged with a female screw threaded member and with a hook-shaped member.

As shown in FIG. 3A, the screw threads 15a, 15b of the bolt 15 are simultaneously engaged with the tapped holes 13b, 14b of the face plates 13c, 14c of the female screw threaded member 13 and hook-shaped member 14.

Figure 3B:
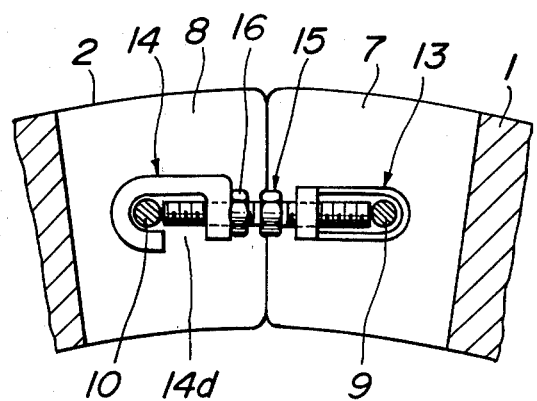
FIG. 3B is a view similar to FIG. 3A and showing a bolt having end portions urged against pins extending through a female screw threaded member and a hook-shaped member, respectively.

In the case of fitting the float around the loading hose (not shown), the bolt 15 is fastened and moved into the female screw threaded member 13 and hook-shpaed member 14 until the opposed end surfaces of the semi-annular floating bodies 1, 2 are brought into contact with each other as shown in FIG. 3B. Reference numeral 16 designates a lock nut operative to maintain the bolt 15 at its tightened position.

As shown in FIG. 3B, in the fastening position of the bolt 15, the end surface of the bolt 15 makes contact with the pin 10 or comes near the pin 10, so that it is possible in a positive manner to prevent the pin 10 from disengaging the hook-shaped member 14.

In addition, the use of the U-shaped member 13a whose lengthwise direction is sufficiently long allows the end surface of the bolt 15 located in the female screw threaded member 13 to move without restricting the fastening action of the bolt 15.

The float for loading hoses constructed as above described according to the invention has the advantage that the use of the female screw threaded member 13 and hook-shaped member 14 both of increased width ensures a distribution of the force subjected to the bolt 15 in its tensile direction over substantially all of the exposed direction of the pins 9, 10. As a result, it is possible to effectively prevent the pins 9, 10 and hook portion of the hook-shaped member from being deformed due to concentration of the stress. Even when the opening 14d of the hook-shaped portion 14 becomes deformed to make it considerably large after the float has been used for many years, the end surface of the bolt 15 projecting into the hook-shaped member 14 and making contact with the pin 10 or locating near it functions to make the opening 14d of the hook-shaped member 14 substantially narrow. Hence it is possible to prevent the pin 10 from disengaging from the opening 14d of the hook-shaped member 14 in a positive manner.

Figure 4A:
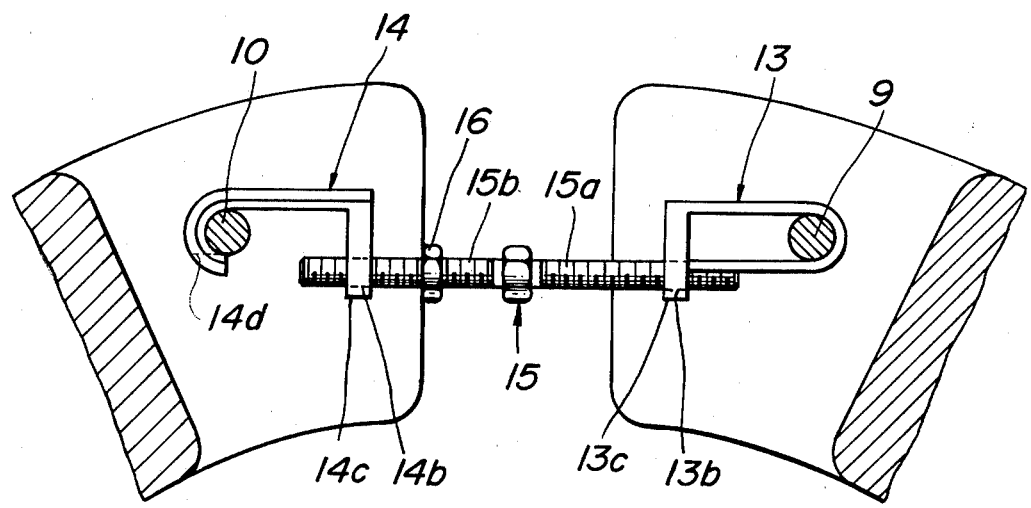
FIGS. 4A and 4B are enlarged cross-sectional views of a second embodiment of a float for loading hoses according to the invention in which front and rear end portions of the bolt make contact with the lower surfaces of the pins extending through the female screw threaded member and hook-shaped member when the bolt is fastened to fit the float around the loading hose.
Figure 4B:
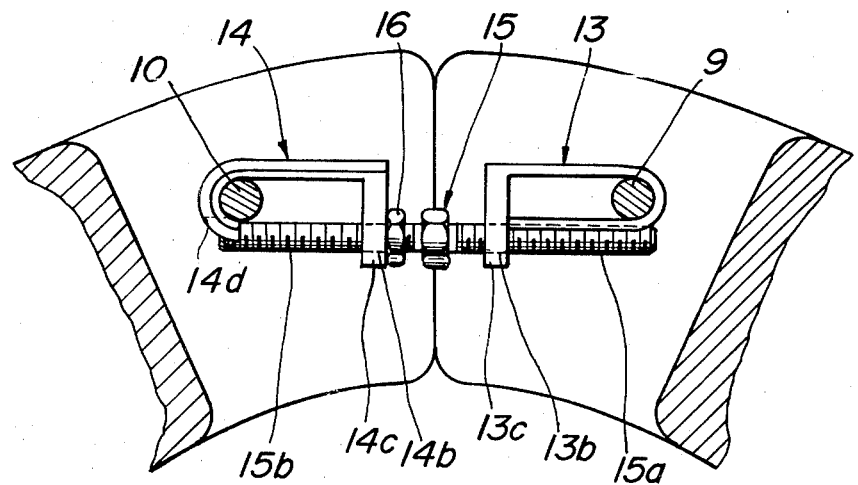

FIGS. 4A and 4B show a second embodiment of a float according to the invention. In this embodiment, a bolt 15 is constructed and arranged such that when the pin 15 is fastened to fit the float around the loading hose (not shown) the front and rear end portions of the oppositely inclined screw threaded portions 15a, 15b of the bolt 15 make contact with the lower surfaces of the pins 9, 10 as shown in FIG. 4B. In the present embodiment, the tapped holes 13b, 14b of the female screw threaded member 13 and hook-shaped member 14 are formed so that the bolt 15 does not make contact with the female screw threaded member 13 and hook-shaped member 14.

FIGS. 5A and 5B show a third embodiment of a float according to the invention. In this embodiment, a bolt 15 is constructed and arranged such that when the bolt 15 is fastened to fit the float around the loading hose (not shown) the front end portion of the oppositely inclined screw threaded portions 15a of the bolt 15 makes contact with the upper surface of the pin 10, while the rear end portion thereof 15b makes contact with the lower surface of the pin 10 as shown in FIG. 5B. In the present embodiment, the tapped holes 13b, 14b of the female screw threaded member 13 and hook-shaped member 14 are formed so that the bolt 15 does not make contact with the female screw threaded member 13 and hook-shaped member 14.

The embodiments shown in FIGS. 4A, 4B and 5A, 5B make it possible to use a bolt 15 of long length irrespective of the size of the float for loading hose.

As stated hereinbefore, the float for loading hose is capable of not only effectively preventing the deformation of the pins 9, 10 and the hook-shaped member 14 but also positively preventing the pin 10 from being disengaged from the hook-shaped member 14.

What is claimed is:

1. A float for loading hoses comprising: a pair of semi-annular hard floating bodies, a first pin extending through one end portion of each of said semi-annular floatingbodies and constituting a hinge on which said semi-annular floating bodies may pivot, a pair of opposed notches formed at the other end portions of said semi-annular floating bodies, a female screw threaded member having a width substantially equal to the width of one of the notches and composed of a U-shaped member opposed to the other notch and provided at its center portion with a tapped hole, said female screw member being secured to said one of said notches by a second pin extending through said one of said notches inside the U-shaped member, a hook-shaped member adapted to be engaged with a third pin extending through the other notch and having a width which is substantially equal to the width of the other notch, and a bolt provided at each end portion with screw threads inclined in opposite direction and threadedly engaged with said female screw threaded member and said hook-shaped member, respectively, whereby when the bolt is fastened to fit the float around the loading hose, the end portions of said bolt are in substantial contacting relationships with respective pins extending through the female screw threaded member and said hook-shaped member and the end of said bolt engaging said hook shaped member prevents said third pin from being disengaged from said hook-shaped member.

2. The float according to claim 1, wherein the end surfaces of said bolt make contact with said pins extending through said female screw threaded member and said hook-shaped member when the bolt is fastened to fit the float around a loading hose.

3. The float according to claim 1, wherein the end portions of said bolt make contact with the radially inner surfaces of said pins extending through said female screw threaded member and said hook-shaped member when the bolt is fastened to fit the float around the loading hose.

4. The float according to claim 1, wherein one end portion of said bolt makes contact with the radially outer surface of said pin extending through said female screw threaded member while the other end portion of said bolt makes contact with the radially inner surface of said pin extending through said hook-shaped member when the bolt is fastened to fit the float around the loading hose.

* * * * *